2,765,293
POLYETHYLENE MODIFIED WITH ETHYLENE DISTEARAMIDE

William B. Happoldt, Wilmington, Del., assignor to E. I. du Pont de Nemours and Company, Wilmington, Del., a corporation of Delaware No Drawing. Application August 26, 1953, Serial No. 376,743

2 Claims. (Cl. 260—45.9)

This invention relates to improvements in the field of solid ethylene polymers, and more particularly to modifications of these polymers to prevent them from cracking or splitting when under certain stresses.

In certain commercial applications for solid polymers of ethylene, it has been found that the polymer exhibits a marked tendency to crack or split when subjected to the action of polar organic liquids while under biaxial stress. This tendency has been useful and valuable in the manufacture of powdered polyethylene (U. S. 2,451,743), but it has been detrimental in polyethylene applications where avoidance of splitting and cracking is of prime importance. For example, the phenomenon occurs undesirably in connection with telephone cables which are insulated with ethylene polymers, when polar organic additives have been applied to facilitate slipping the insulated cable through conduits. When cables which have been treated in this manner are bent, the ethylene polymer insulating cover is under biaxial stress, and splitting occurs.

An object of this invention is to provide solid ethylene polymer compositions which resist splitting under biaxial stress when subjected to polar organic media. Another object is to provide a method for modifying these ethylene polymers to make them more useful in applications in which they are liable to be subjected to stress. A further object is to modify pigmented ethylene polymers to prevent such splitting. Other objects will appear from the description of the invention given below.

These objects are accomplished by the provision of a composition comprising solid ethylene polymer containing a small amount of ethylene distearamide.

The action of ethylene distearamide in suppressing the above-described splitting of polyethylene is rather unique, although other closely related amides exhibit a corresponding effect in lesser degree. For example, the simple amides such as stearamide offer only slight resistance to splitting and are of no practical value for this purpose. The diabasic acid diamides are quite effective, but only when a relatively high concentration thereof is used.

While the additive described herein may be applied in combination with any solid polyethylene to insure against the splitting and cracking which has just been described, it is obviously most valuable when used with polyethylenes which are of low enough molecular weight to exhibit the splitting and cracking phenomenon in a rather marked degree. The additive is effective even with relatively high molecular weight polymers, however, since on prolonged subjection to stress in the presence of a polar organic medium even these polymers exhibit the said phenomenon.

The organic media which are most effective in causing undesirable cracking and splitting include alcohols, especially the lower alcohols such as methanol and ethanol, acetone, acetic acid, ethyl acetate, and many others. The quantity of this amide required to produce this anti-splitting effect is from about 0.5 to 5.0%, based on the weight of the solid ethylene polymer in the composition although it is preferred for most applications to employ from 2% to 3% of the amide. Larger amounts than 5% may be used if desired.

The following table shows the effect to ethylene distearamide in imparting crack resistance to polyethylene. In each instance the modifier was incorporated into the polymer by means of milling rolls. Sheets were molded from the resulting mixtures, to a thickness of 0.125 in. Samples 1.5 in. x 0.5 in. were cut from each sheet, and a 0.75 in. slit, 0.020 to 0.025 in. deep was cut lengthwise, centered on one side of each sample. The samples were bent and inserted in a ¾ in. test tube, with the slit on the outside of the bend. The samples were then subjected to the action of a standard polar medium (a soap solution) at 50° C. The time required for cracking was noted, with results as follows.

Crack resistance of modified polyethylene

| Percent Modifier | Modifier | Time Required for First Split | Time Required for Complete Splitting |
|---|---|---|---|
| 5 | control | 1 to 2 hrs | 1 to 2 hrs. |
| 5 | "Opalwax," hydrogenated Castor oil. | 20 hrs | ca. 2 days. |
| 5 | paraffin wax | | 1 hr. |
| 5 | "Chlorowax" 70 chlorinated paraffin wax. | | less than 8 hrs. |
| 1 | ethylene distearamide | 13 days | 65 days. |
| 5 | ----do---- | (1) | (1) |
| 10 | ----do---- | (1) | (1) |
| 25 | ----do---- | (1) | (1) |

1 Intact after ca. 4 months.

It is to be understood that minor amounts of such ingredients as dyestuffs, antioxidants, etc. may be present in the compositions of this invention. In general no modifiers having an essential effect on the crack resistance are necessary, other than ethylene distearamide.

The invention is highly valuable in the manufacture of cables or other articles wherein it is desirable to prevent splitting and cracking of polyethylene by the action of polar liquids when the polyethylene is placed under stress.

I claim:

1. A composition of matter consisting essentially of polyethylene and 0.5 to 5.0% of ethylene distearamide, based on the weight of polyethylene.

2. A composition consisting essentially of polyethylene and ethylene distearamide, the content of ethylene distearamide being from 0.5 to 25% of the weight of polyethylene.

No references cited.